May 13, 1958 S. WEISBAUM 2,834,947
FIELD DISPLACEMENT ISOLATOR
Filed April 25, 1955 3 Sheets-Sheet 1

INVENTOR
S. WEISBAUM
BY
Franklin Mohr
ATTORNEY

May 13, 1958  S. WEISBAUM  2,834,947
FIELD DISPLACEMENT ISOLATOR
Filed April 25, 1955  3 Sheets-Sheet 2

INVENTOR
S. WEISBAUM
BY
Franklin Mohr
ATTORNEY

United States Patent Office 2,834,947
Patented May 13, 1958

2,834,947

FIELD DISPLACEMENT ISOLATOR

Samuel Weisbaum, Morristown, N. J., assignor to Bell Telephone Laboratories, Incorporated, New York, N. Y., a corporation of New York Application April 25, 1955, Serial No. 503,678

10 Claims. (Cl. 333—81)

This invention relates to nonreciprocal transmission devices for use in wave guide systems and more particularly to an isolator of the field displacement type.

An isolator is defined as a device which may be employed to isolate an electromagnetic device from other portions of an electromagnetic wave system, in the sense that waves may be freely transmitted in the direction from the device through the isolator to the system, designated the forward direction, but waves originating outside of the device and traveling in the opposite direction, designated the reverse direction, are attenuated by the isolator to the extent required to prevent deleterious reaction of the system upon the device to be isolated.

An isolator of the field displacement type is one which operates by virtue of a nonreciprocal action whereby the field pattern in a wave guide is modified or displaced so that the field pattern is materially different depending upon the direction of propagation of the wave through the isolator.

In accordance with the invention, there is employed an element of gyromagnetic material, such as ferrite, having two parallel flat faces defining a thickness therebetween which is moderately critical in value relatively to the free space wavelength of a given wave to be transmitted. The said element may be placed within a wave guide of rectangular cross section with the said faces parallel to the narrower side walls at a critical spacing therefrom, whereat the field pattern of wave transmission for one direction of propagation has substantially a null value of the electric field component at one face of the gyromagnetic element.

To minimize reflections due to the presence of the gyromagnetic material the latter preferably does not extend the full distance between the longer sides of the rectangular wave guide, i. e., it is less in height than the narrower dimension of the wave guide. The intensity of the reflected wave returning is thereby rendered small compared to the wave impressed upon the isolator, a condition commonly designated as a large return loss.

Resistive material for producing loss in the reverse direction is placed upon the said face in the null field region with the effect that substantially no attenuation results for a wave propagated in the forward direction. The gyromagnetic material reacts differently to waves propagated in the respective directions, with the result that a high intensity of the electric field component is developed at the location of the resistive material for a wave propagated in the reverse direction.

Letting $\delta$ represent the thickness of the gyromagnetic element between the parallel faces, $\gamma$ the spacing between one face and the nearest narrow side wall of a rectangular wave guide of longer side dimension L and $t$ the thickness of the resistive material (applied as a sheet or film upon the second face of the gyromagnetic material), and $\lambda_0$ the free space wavelength at the center of a desired frequency band, the best spacing is found to be determined by the formula $$\delta + \frac{\gamma}{2} - 2t = \frac{\lambda_0}{9.55}$$

for thickness of resistive sheet of carbon coated polyethylene in the range of 0.003 to 0.009 inch and a mid-band frequency of 6175 megacycles per second. More generally a relationship of $$\delta + \frac{\gamma}{2}$$

equal to a constant is found to hold, for $\delta$ in the range of 0.175 to 0.200 inch. In general, the divisor of $\lambda_0$ differs from 9.55 if the resistive coating is a sprayed-on film instead of an attached sheet.

For broad band operation, the resistive material should be arranged in a particular configuration. Where the gyromagnetic element is less in height than the narrower dimension of the wave guide and the element has a rectangular face upon which the resistive material is placed, it has been found that there are certain portions of the face where maximum absorption in the resistive material occurs at the lower frequency side of a broad frequency band and other portions where maximum absorption occurs at the higher frequency side of the band. For the lower frequencies the region of maximum absorption is a centrally located longitudinal strip approximately one-half the length of the longer side of the rectangular face. For the higher frequencies there are two regions of maximum absorption in diagonally opposite corners of the rectangular face. All of these regions may be covered sufficiently in a convenient form by means of a centrally located longitudinal strip of resistive material and a diagonally located strip approximately the length of the diagonal of the rectangular face. Which of the two possible diagonal positions the latter strip occupies has been found not to be important.

An object of the invention is to obtain a large ratio of reverse loss to forward loss over a relatively broad frequency band, and more particularly a large reverse loss coupled with a small forward loss.

Another object is to maintain a relatively large return loss over the entire frequency band.

As herein used and in accordance with common terminology, reverse loss is the attenuation suffered by a wave propagated through the device in the direction of higher attenuation. Forward loss is the attenuation suffered by a wave propagated in the direction of lower attenuation. Return loss is the ratio between the amplitude of a wave impressed upon the device in either direction and the amplitude of the resultant reflected wave returned by the device in the direction from which the original wave is impressed. Each of these values of loss may be expressed in decibels in well known manner.

In an isolator that has been built and successfully operated in accordance with the invention, a reverse loss of at least 30 decibels is maintained over the frequency band extending from 5925 to 6425 megacycles per second together with a maximum forward loss of approximately 0.2 decibel and a minimum return loss of 30 decibels. In some practical applications a requirement for an isolator may be expressed as the ratio of the number of decibels reverse loss to the number of decibels of forward loss, usually specifying also a maximum forward loss or a minimum reverse loss. A requirement for a ratio of at least 100 to 1 of reverse loss to forward loss was satisfied by the above-mentioned isolator which was designed for use in a certain proposed radio relay system.

Figure 1:
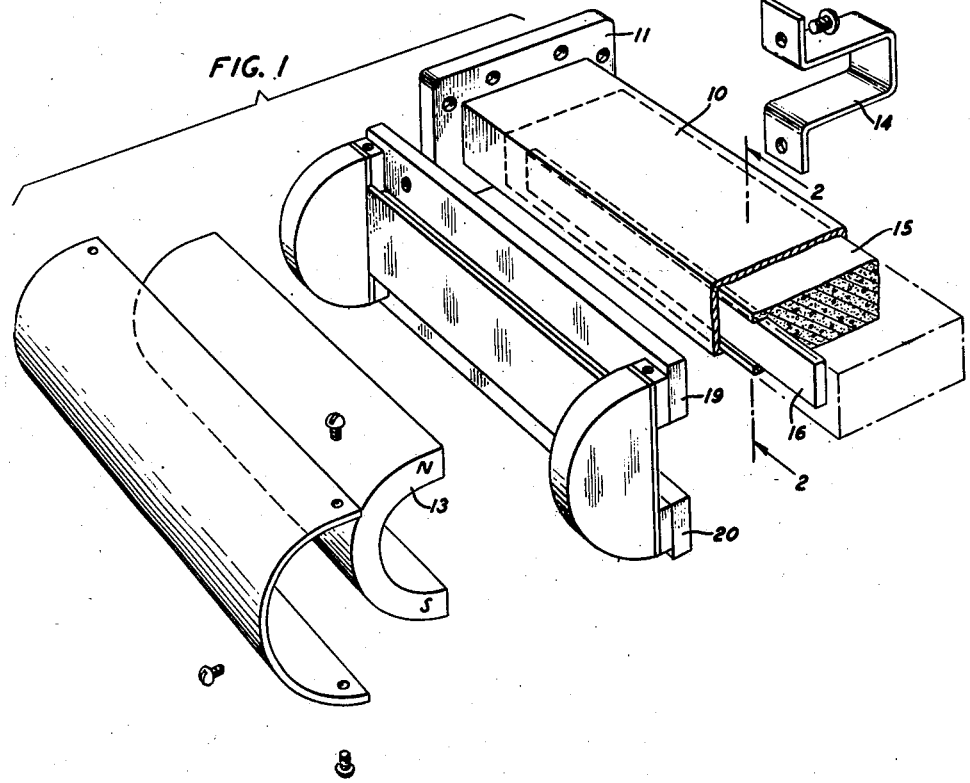
Fig. 1 is a perspective view of an embodiment of the invention showing the constituent parts partially disassembled and with a portion broken away.

In Fig. 1 is shown an exterior view of a device in accordance with the invention, comprising a length of hollow-pipe wave guide 10 of rectangular cross section with terminal flanges provided for convenience in connecting the wave guide 10 into a wave guide assembly. For clarity in the drawing only one flange 11 is shown. A permanent magnet 13 of generally U-shaped cross section and of length comparable with that of the wave guide 10 is shown enveloping a portion of the wave guide and secured in position by clamps such as clamp 14.

In addition there is shown a holder 15 as of foamed polystyrene and a ferrite element 16 with sprayed resistive coatings 17 and 18 (Fig. 5) one one face thereof. The magnet 13 is provided with pole pieces 19 and 20. The holder 15 contains a recess 21 (Fig. 2) accurately positioned to support the ferrite element 16 in a preferred location within the wave guide 10. Close fitting of the element 16 in the recess 21 may eliminate any need for a covering or spacing member between the element 16 and the adjacent side wall of the wave guide 10. The magnet 13 is so placed that it provides a suitable biasing flux through the element 16. The element 16 in the embodiment shown is placed with the resistively coated face against the inner surface of the recess 21.

Figure 2:
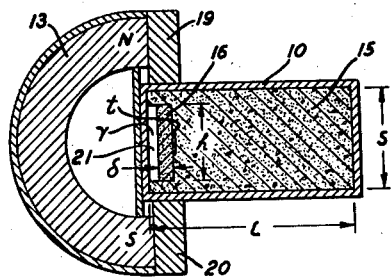
Fig. 2 is a cross-sectional view at the plane indicated by line 2—2 in Fig. 1.

Fig. 2 shows a cross section of the device of Fig. 1. The longer inside dimension of the rectangular cross section of the wave guide 10 is designated L and the smaller inside dimension S. The thickness of the cross section of the element 16 is designated $\delta$ and its spacing from the nearest narrow side wall of the wave guide is designated $\gamma$. The thickness of the resistive coating upon the face of the element 16 is designated $t$.

The presence of the ferrite element influences the field pattern of electromagnetic waves transmitted through the wave guide, the influence resulting in different field patterns for the two opposed directions of wave propagation. In accordance with the invention, the ferrite element is given such a thickness and is so spaced from the wave guide wall as to produce for one direction of wave propagation a wave pattern having a relatively very low value of electric component of the field intensity at all times in a plane parallel to the longitudinal axis of the wave guide 10 lying in the resistively coated face of the element 16. For wave propagation in the opposite direction, the electric component of the field intensity in this plane is found to have a relatively high value, particularly when the ferrite thickness and spacing and the resistive coating thickness are interrelated with the free space wavelength in accordance with the above-mentioned formula $$\delta + \frac{\gamma}{2} - 2t = \frac{\lambda_0}{9.55}$$

To reduce wave reflections and eddies due to disturbance of the otherwise uniform impedance of the wave guide caused by the presence of the ferrite element, the height $h$ of the ferrite is preferably made somewhat less than S, the height of the wave guide.

The impedance match between an air region and an air-ferrite-air region containing the element 16 with space above and below the element as in Fig. 2 is generally better than that between an air region and a pure ferrite region where the ferrite extends from top to bottom of the wave guide.

Figure 3:
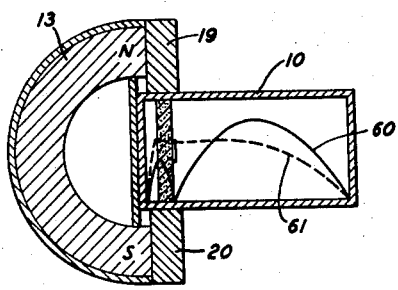
Fig. 3 is a diagram illustrating electric field intensities over a cross section similar to that shown in Fig. 2.

Fig. 3 shows in full line 60, for a ferrite element the full height S, the approximate variation of the electric component of field intensity along the width of the wave guide in the presence of the ferrite element for the direction of wave propagation that results in the minimum attenuation. A full height ferrite element is illustrated because calculations of field pattern are available for that case. Theoretically, in the absence of an electric component of field intensity, no energy is absorbed in the resistive coatings. Practically, the field intensity does not disappear completely for the less than full height ferrite element or for the full height element and a minimum of absorption is observed in either case. The broken line 61 in the figure shows the approximate variation of the electric component of field intensity for the reverse direction of wave propagation. As in this case there is an electric component of considerable intensity at the ferrite surface, the resistive coatings absorb a large amount of energy from the wave thereby causing a substantial attenuation of the wave, i. e., a large reverse loss.

The sensitivity of the device to the thickness and placement of the ferrite element affects principally the minimum ratio which will be found to exist between reverse loss and forward loss at a particular frequency.

To enable the device to operate over a relatively broad frequency band, the resistive coatings may be given a particular configuration which has been found most favorable.

Various portions of the face bearing the resistive coatings are found to influence the energy absorption differently at frequencies above or below the frequency of best operation.

Figure 4:
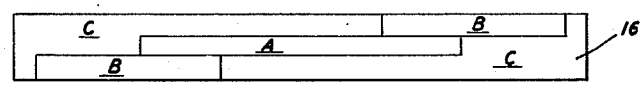
Fig. 4 is a diagram showing various regions of the surface of a ferrite element characterized by different ranges of value of electric field intensity as a function of frequency.

Fig. 4 shows the face of the ferrite element 16 divided into three kinds of regions designated A, B, and C, respectively. In a wave guide that was designed for operation in a frequency band extending from 5925 to 6425 megacycles per second, the characteristic effects of the regions were found to be as follows.

Region A had no effect on the forward loss but gave maximum absorption, i. e. high reverse loss, at 5925 megacycles per second and little or no effect on either forward loss or reverse loss at 6425 megacycles per second.

Regions B had little or no effect on either forward loss or reverse loss at the lower frequency but gave maximum absorption at the higher frequency with substantially no effect on forward loss.

Regions C had substantially no effect on forward loss and produced a slight increase in reverse loss at the lower frequency but increased the forward loss considerably at the higher frequency.

Accordingly, it is preferable to omit resistive coating in regions C. The presence of resistive coating in regions A and B is evidently conducive to broad band operation. Therefore, the coatings are preferably confined substantially to regions A and B. It has been found also that it is advantageous to have a lower effective resistance in region A than in regions B. These requirements are conveniently met by applying two overlapping coatings.

Variations in field pattern in the vertical direction in Fig. 2, giving rise to various regions as shown in Fig. 4, are reasonably to be expected inasmuch as the ferrite element does not extend from top to bottom of the wave guide. Hence, the electric and magnetic properties vary somewhat in going from the air region to the ferrite region along the vertical direction. This is in contradistinction to the case wherein the ferrite element does extend from top to bottom of the wave guide, in which case the electric and magnetic properties tend to be uniform along the vertical direction.

Figure 5:
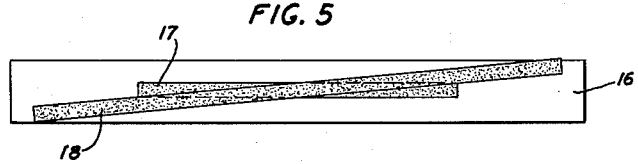
Fig. 5 is a diagrammatic showing of a configuration of resistive coatings on a ferrite surface.

Fig. 5 shows a preferred scheme of overlapping coatings. One coating 17 comprises a centrally located longitudinally extending strip approximately half the length of the element 16. The other coating 18 comprises a diagonally located strip approximately as long as the diagonal of the rectangular face of the element 16.

The arrangement of resistive coatings in the type of configuration shown in Fig. 5 embodies the joint invention of F. J. Sansalone and S. Weisbaum, claimed in their application Serial No. 503,677, filed April 25, 1955, concurrently herewith.

Figure 6:
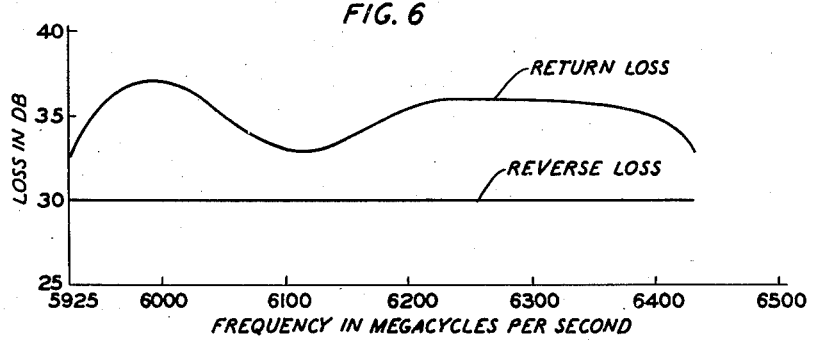
Fig. 6 is a graph of values of reverse loss and return loss measured over an extended frequency range in a device like that shown in Fig. 1.
Figure 7:
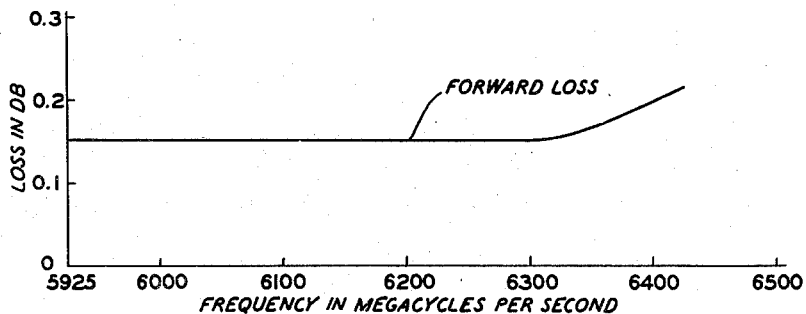
Fig. 7 is a graph of values of forward loss measured over the same frequency range in the same device represented by the graph in Fig. 6.

Fig. 6 shows the variation of the reverse and return losses and Fig. 7 the variation of the forward loss, each in decibels over the frequency band from 5925 megacycles per second to 6425 megacycles per second for the hereinabove mentioned embodiment that was built substantially in accordance with Figs. 1 and 5 and successfully operated. The forward loss is 0.15 decibel over the range from 5925 to 6300 mebacycles per second and rises to a maximum of 0.22 decibel at 6425 megacycles per second. The reverse loss is substantially uniformly 30 decibels over the entire range. The return loss is at least 32.5 decibels over the same range.

The value of the saturation magnetization of the ferrite selected is important for best operation, i. e. maximum loss ratio. In the literature, the saturation magnetization is commonly designated by $4\pi M_s$. In the frequency band of 5925 megacycles per second to 6425 megacycles per second, a value of $4\pi M_s$ equal to 1700 gauss was found to be optimum. Values as low as 1600 gauss and as high as 1800 gauss were slightly inferior.

It is found that where a satisfactory isolator is designed for one frequency band the design parameters may be scaled up or down to derive a satisfactory isolator for a different frequency band. In particular, the saturation magnetization of the ferrite should be one selected to have a value in direct proportion to the change in the mid-band frequency. At the same time, both the height and the thickness of the ferrite element should be changed in the inverse ratio of the mid-band frequencies. For example, an isolator which gives good performance in a frequency band centered at 6000 megacycles per second, may be used as the basis for the design of an isolator which will give substantially the same performance in a frequency band centered at 12,000 megacycles per second. For the latter band, the saturation magnetization should be twice that for the former band. The height and thickness of the ferrite element should at the same time each be half as great as before. The new value of saturation magnetization may be obtained by selecting a specifically different ferrite from many available such materials which are known to present a fairly wide choice of values of saturation magnetization.

The resistive coatings 17, 18 may be strips of carbon coated polyethylene material pasted or otherwise secured to the face of the ferrite material. Alternatively, resistive material such as graphite may be sprayed on the surface over areas limited as by a metal mask. In the arrangement of Fig. 5, two masks may be employed, one for the longitudinal strip and one for the diagonal strip. A suitable spray coating was found to have a specific resistivity of 96 ohms per square and the overlapping of the two coats was found to produce a specific resistivity in the overlapping area of 72 ohms per square.

In the hereinabove mentioned successfully operated embodiment, the inside dimensions of the wave guide were $L=1.590$ inch
$S=0.793$ inch The optimum displacement $\gamma$ of the ferrite from the side wall was found to be 0.075 inch for a ferric element of thickness $\delta$ equal to 0.180 inch. The height of the ferrite element was 0.550 inch and the length 5 inches. The resistive coatings were sprayed strips each one-eighth inch wide, the longitudinal strip being 2.75 inch long and the diagonal strip being 4.5 inches long. The estimated thickness of resistive coating was 0.0015 inch. The metallic proportions in the ferrite element were $Mg_{0.9}Mn_{0.1}Fe_{1.2}$ having a saturation magnetization $4\pi M_s$ of approximately 1700 gauss. The applied external magnetizing field was approximately 685 gauss.

Figure 8:
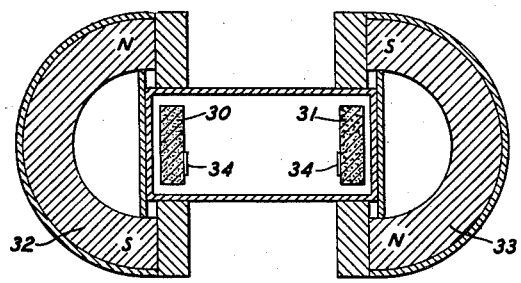
Fig. 8 is a cross-sectional view of a two-element embodiment illustrated in similar fashion to the view of a single-element embodiment as shown in Fig. 2.

Fig. 8 shows the application of the principles of the invention to a double slab isolator using one ferrite slab on each side of the center of the wave guide. In the figure, the ferrite elements 30 and 31, each of thickness $\delta$ are mounted at a distance $\gamma$ from the narrower wall of the wave guide. As the rotation of the magnetic vector of the traveling wave is in opposite senses in the two sides of the wave guide, it is necessary, in order to provide the same relationship between the externally applied magnetizing field and the rotating magnetic component of the field of the traveling wave on both sides of the center, that the direction of the externally applied magnetizing field be in the reverse sense through the respective ferrite elements. For this purpose magnets 32, 33 of opposite polarity are provided. Each element 30, 31 has one or more resistive film strips 34 mounted on the side of the element nearer the center of the wave guide.

The double slab arrangement was found to have unexpected properties and is the joint invention of this applicant and H. Boyet, claimed in a concurrently filed application, Serial No. 503,382, filed April 25, 1955.

In an embodiment of the double slab isolator that was built and successfully operated, the inside dimensions of the wave guide were $L=0.9$ inch
$S=0.4$ inch The optimum displacement $\gamma$ of each ferrite element from the nearest side wall was found to be 0.028 inch. The thickness $\delta$ of each ferrite element was 0.099 inch. Each element had a height of 0.303 inch and a length of 5 inches. The resistive coating were sprayed graphite strips each one-sixteenth inch wide, the horizontal strip being 2.75 inches long and the diagonal strip being 4.5 inches long. The estimated thickness of resistive coating was one to two mils. The metallic proportions in the ferrite were $Ni_{0.3}Cu_{0.1}Zn_{0.1}Mn_{0.02}Fe_{1.9}$ having a saturation magnetization $4\pi M_s$ of approximately 3600 gauss. The applied external magnetizing field supplied by each magnet 32, 33 was approximately 1045 gauss. The isolator was designed for the frequency band from 10,700 to 11,700 megacycles per second.

It was discovered by the joint inventors of the arrangement of Fig. 8 that the reverse loss resulting from the juxtaposition of two ferrite elements in a single section of wave guide is materially more than twice the reverse loss for an otherwise identical device containing but one ferrite element as in the arrangement of Figs. 1–3. For example, where the single slab isolator gave a measured minimum reverse loss of 26 decibels, the corresponding double slab isolator gave a measured minimum reverse loss of 64 decibels at 10,700 megacycles per second and a reverse loss of over 69 decibels from 10,800 to 11,700 megacycles per second. In each case the forward loss was not over one decibel.

Figure 9:
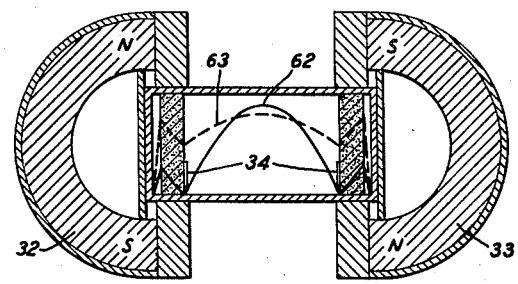
Fig. 9 is a diagram for the two-element case corresponding to the diagram of Fig. 3 for the single-element case.

The greater than expected value of reverse loss is believed to be attributable to a more favorable wave pattern developed in the symmetrical arrangement of the double slab isolator. The distributions of the electrical field for full height ferrite elements are believed to be qualitatively of the type shown in Fig. 9, the solid curve 62 being for wave propagation in the forward direction and the dotted curve 63 for the reverse direction.

Figure 10:
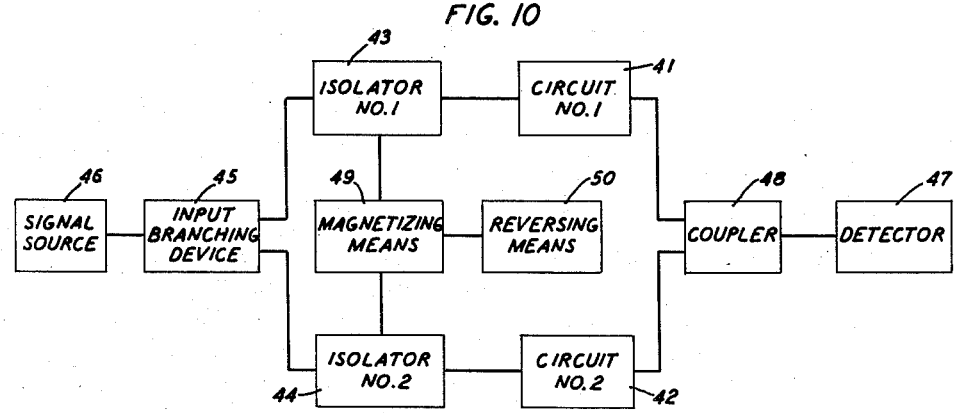
Fig. 10 is a block diagram of a measuring system employing isolators as switches.

Fig. 10 shows in single line schematic form a measuring system in which two isolators of the type of Figs. 1–3, or of the type of Fig. 8, or other types are combined to form the equivalent of two double-pole, double-throw switches adapted for rapid or automatic manipulation. In the figure, boxes 41 and 42 represent two circuits which are to be compared as to performance. Isolators 43 and 44 are disposed one in tandem with each box. An input branching circuit 45, such as a wave guide T-junction, may be provided as shown, to connect a wave from a signal source 46 to the input sides of both isolators. The two circuit branches may be connected to a detector 47 through a directional coupler 48 or other wave junction device. A source 49 of magnetizing potential may be provided, connected to both isolators and controlled by polarity reversing means 50, so that either isolator 43 is in the low loss condition and isolator 44 is in the high loss condition, or vice versa. The reversing means may be of any known type, and in particular may be designed to operate at a high frequency of reversal. For making repeated comparison measurements as between the circuits in the boxes 41 and 42 a 60 cycle per second rate of reversal is advantageous for use with a 60 cycle power supply.

In the operation of the system of Fig. 10, the isolator 43 when in the low loss condition permits transmission from the signal source 46 through the circuit of box 41 to the detector 47. At the same time, the isolator 44 is in the high loss condition, substantially preventing transmission from the source 46 through the box 42 to the detector. Upon reversal of the polarity of the magnetization, the isolator 43 goes into the high loss condition and the isolator 44 goes into the low loss condition. The detector thus receives transmission alternately through the boxes 41 and 42, whereby comparison measurements and transmission balances may be obtained in well known manner.

It is to be understood that the above-described arrangements are illustrative of the principles of the invention. Numerous other arrangements may be devised by those skilled in the art without departing from the spirit and scope of the invention.

What is clamed is:

1. In a device for producing nonreciprocal wave transmission by displacing the electromagnetic field distribution of wave energy with a magnetically polarized gyromagnetic element to provide an electric field intensity differential in wave energy being transmitted in opposite directions through said device and including a coating of material of electrical characteristic different from said gyromagnetic element for converting said field intensity differential into a nonreciprocal attenuation, a wave guide of rectangular cross section having wide and narrow sides, said gyromagnetic element having two substantially parallel plane faces defining a thickness therebetween, said element being mounted longitudinally within said wave guide with a material spacing from each of the narrower side walls, said spacing being more than one-half the width of said guide from one of said narrow side walls and less than one-half the width from the other of said narrow side walls, said coating being on that one of said parallel plane faces of the gyromagnetic element facing that one of said narrow side walls from which said element is spaced more than one-half the width of said guide.

2. In a device for producing nonreciprocal wave transmission by displacing the electromagnetic field distribution of wave energy with a magnetically polarized gyromagnetic element to provide an electric field intensity differential in wave enegy being transmitted in opposite directions through said device and including a material of electrical characteristic different from said gyromagnetic element for converting said field intensity differential into a non-reciprocal attenuation, a wave guide of rectangular cross-section having wide and narrow side walls, said gyromagnetic element being mounted within said wave guide and spaced from said walls, said gyromagnetic element supporting said material in the form of a film on a surface thereof parallel to one of said narrow side walls.

3. In a device for producing nonreciprocal wave transmission by displacing the electromagnetic field distribution of wave energy with a magnetically polarized gyromagnetic element to provide an electric field intensity differential in wave energy being transmitted in opposite directions through said device and including a material of electrical characteristic different from said gyromagnetic element for converting said field intensity differential into an impedance differential for said oppositely transmitted wave energy, a wave guide of rectangular cross-section having wide and narrow side walls, said gyromagnetic element being mounted within said wave guide and spaced from said walls and having a coating of said material on a surface thereof parallel to one of said narrow walls.

4. In a device for producing nonreciprocal wave transmission by displacing the electromagnetic field distribution of wave energy with a magnetically polarized ferrite element to provide an electric field intensity differential in wave energy being transmitted in opposite directions through said device and including resistive material for converting said field intensity differential into a nonreciprocal attenuation, a rectangular wave guide of longer side dimension L, said ferrite element having two substantially parallel plane faces defining a thickness $\delta$ therebetween, said resistive material comprising a coating of thickness $t$ on one side of said parallel faces of the ferrite element, said element being mounted within said wave guide with the other parallel face spaced a distance $\gamma$ from one of the narrower side walls of the wave guide, the thickness $\delta$ lying in a range approximately 11 percent to 12.6 percent of L and the spacing $\gamma$ satisfying the formula $$\delta + \frac{\gamma}{2} - 2t = \frac{\lambda_0}{9.55}$$

where $\lambda_0$ is the free space wavelength at an operating frequency of the device.

5. The combination as in claim 4, in which the shorter side dimension of the rectangular wave guide is S and the height $h$ of the ferrite element is materially less than S.

6. The combination as in claim 4, in which the ferrite element is rectangular in cross section having height $h$ materially less than the short side dimension of the wave guide.

7. In a device for producing nonreciprocal wave transmission by displacing the electromagnetic field distribution of wave energy with a magnetically polarized gyromagnetic element to provide an electric field intensity differential in wave energy being transmitted in opposite directions through said device and including a material of electrical characteristic different from said gyromagnetic element for converting said field intensity differential into a nonreciprocal attenuation, a section of rectangular wave guide, said element of gyromagnetic material having two substantially parallel plane faces positioned within said guide, and said material being in the form of a film mounted on one of said faces, the other of said faces being spaced away from one of the narrower walls of said guide by a distance substantially equal to twice the difference between a fraction of the wavelength of said waves and the thickness between said faces, said fraction lying between ten and twelve percent of said wavelength.

8. In a device for producing nonreciprocal wave transmission by displacing the electromagnetic field distribution of wave energy with a magnetically polarized gyromagnetic element to provide an electric field intensity differential in wave energy being transmitted in opposite directions through said device and including a member comprising material of electrical characteristic different from said gyromagnetic element for converting said field intensity differential into an impedance differential for said oppositely transmitted wave energy, a rectangular wave guide, said magnetically polarized element of gyromagnetic material extending longitudinally within said guide and spaced away from the axis of said guide and the narrower walls thereof, and said member being mounted on the side of said element facing said axis.

9. In a device for producing nonreciprocal wave transmission by displacing the electromagnetic field distribution of wave energy with a magnetically polarized gyromagnetic element to provide an electric field intensity differential in wave energy being transmitted in opposite directions through said device and including a vane of material of electrical characteristic different from said gyromagnetic element for converting said field intensity differential into a nonreciprocal attenuation, a section of rectangular wave guide having a nonmagnetic non-dissipating dielectric medium included therein, said element of gyromagnetic material being longitudinally disposed to divide said medium into two unequal portions, and said vane extending longitudinally and in contiguous relation to said element in the larger one of said portions.

10. In a device for producing nonreciprocal wave transmission by displacing the electromagnetic field distribution of wave energy with a magnetically polarized gyromagnetic element to provide an electric field intensity differential in wave energy being transmitted in opposite directions through said device and including a material of electrical characteristic different from said gyromagnetic element for converting said field intensity differential into an impedance differential for said oppositely transmitted wave energy, a conductively bounded rectangular wave guide for electromagnetic wave energy, said element being in the form of a flattened vane located within said guide with parallel faces thereof extending parallel to a narrow wall of said guide, said vane being spaced away from said narrow wall to produce substantially a zero intensity of the electric field of energy propagating in one direction within said guide along the plane of the face farthest removed from said narrow wall, and said material located upon said face substantially in said plane.

References Cited in the file of this patent

UNITED STATES PATENTS

| | | |
|---|---|---|
| 2,644,930 | Luhrs | July 7, 1953 |
| 2,705,780 | Weber | Apr. 5, 1955 |
| 2,745,069 | Hewitt | May 8, 1956 |
| 2,776,412 | Sparling | Jan. 1, 1957 |

FOREIGN PATENTS

| | | |
|---|---|---|
| 674,874 | Belgium | July 2, 1952 |

OTHER REFERENCES

Fox et al.: "Behavior and Applications of Ferrite," Bell Technical Journal, vol. 34, No. 1, January 1955, pp. 5–104.